(12) United States Patent
Yip et al.

(10) Patent No.: US 10,657,631 B2
(45) Date of Patent: May 19, 2020

(54) APPARATUS AND METHOD FOR CONTROLLING CONTRAST RATIO OF CONTENT IN ELECTRONIC DEVICE

(71) Applicant: Samsung Electronics Co., Ltd., Suwon-si, Gyeonggi-do (KR)

(72) Inventors: Eric Yip, Suwon-si (KR); Dong-Yeon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 15/770,673

(22) PCT Filed: Oct. 27, 2016

(86) PCT No.: PCT/KR2016/012196
§ 371 (c)(1),
(2) Date: Apr. 24, 2018

(87) PCT Pub. No.: WO2017/074076
PCT Pub. Date: May 4, 2017

(65) Prior Publication Data
US 2019/0206032 A1    Jul. 4, 2019

(30) Foreign Application Priority Data
Oct. 27, 2015    (KR) .......................... 10-2015-0149539

(51) Int. Cl.
*G06T 5/00*   (2006.01)
*G06T 7/11*   (2017.01)
(Continued)

(52) U.S. Cl.
CPC ................ *G06T 5/008* (2013.01); *G06T 5/40* (2013.01); *G06T 7/11* (2017.01); *G06T 7/13* (2017.01);
(Continued)

(58) Field of Classification Search
CPC .. G06T 5/008; G06T 5/40; G06T 7/13; G06T 7/11; G06T 2207/20208; G06T 2207/10024
See application file for complete search history.

(56) References Cited

U.S. PATENT DOCUMENTS 9,147,230 B2    9/2015   Saito et al.
2005/0013484 A1*   1/2005   Ohkawa ............... H04N 1/4074
                                                     382/168
(Continued)

FOREIGN PATENT DOCUMENTS

KR    10-2004-0104867 A    12/2004
KR    10-2012-0112709 A    10/2012

*Primary Examiner* — Menatoallah Youssef
(74) *Attorney, Agent, or Firm* — Jefferson IP Law, LLP

(57) ABSTRACT

An apparatus and a method for controlling a contrast ratio of content in an electronic device are disclosed. The method for controlling a contrast ratio of content in an electronic device, presented in one embodiment of the present disclosure, comprises the steps of: identifying one or more highlight regions on the basis of brightness information of a frame forming the content; determining thresholds for detecting the one or more highlight regions from the frame; generating one or more masks corresponding to the one or more highlight regions on the basis of the thresholds; and generating a contrast ratio-controlled frame on the basis of the one or more masks and one or more boosting factors for the content.

13 Claims, 11 Drawing Sheets

(51) Int. Cl.
   *G06T 7/13*     (2017.01)
   *G06T 5/40*     (2006.01)
(52) U.S. Cl.
   CPC ............... *G06T 2207/10024* (2013.01); *G06T 2207/20208* (2013.01)

(56) References Cited

U.S. PATENT DOCUMENTS

| | | |
|---|---|---|
| 2009/0041375 A1 | 2/2009 | Cohen et al. |
| 2011/0188744 A1 | 8/2011 | Sun |
| 2012/0002082 A1 | 1/2012 | Johnson et al. |
| 2014/0168249 A1* | 6/2014 | Rempel .................... G09G 5/10 345/589 |
| 2018/0130188 A1* | 5/2018 | Farrell .................... G06T 5/007 |

* cited by examiner ial Application No. PCT/KR2016/012196, which was
APPARATUS AND METHOD FOR CONTROLLING CONTRAST RATIO OF CONTENT IN ELECTRONIC DEVICE

CROSS-REFERENCE TO RELATED APPLICATION(S)

This application is a National Phase Entry of PCT International Application No. PCT/KR2016/012196, which was filed on Oct. 27, 2016, and claims priority to Korean Patent Application No. 10-2015-0149539, which was filed on Oct. 27, 2015, the contents of which are incorporated herein by reference.

TECHNICAL FIELD

The present disclosure relates to an apparatus and method for controlling a contrast ratio of content in an electronic device.

BACKGROUND ART

As large-size home televisions (TVs) have been steadily popular among consumers, the quality of displays in the TVs have become important factors for differentiating products from competitors. With the emergence of the ultra-high definition (UHD) TV age, other new techniques such as three-dimensional (3D) techniques, high frame rate techniques, and high dynamic range (HDR) techniques are also included in packaged UHD franchises. Although these various new techniques are provided in electronic devices, there is no technique for distinguishing a difference between UHD and HD by a user in a TV supporting new UHD.

The HDR technique has been popularized for photographing and camera technologies, but has not been used widely in video technologies due to incomplete standardization of the HDR technique.

For example, in spite of expansion of an HDR ecosystem through HDR-supporting displays and HDR-based content distribution, most contents are still generated by a standard dynamic range (SDR) technology due to the amount of legacy contents. In particular, since broadcasting stations implement the HDR technology in their ecosystems, broadcasting of HDR-based contents (e.g., live or pre-recorded contents) has been delayed. Fundamentally, a main issue of the HDR technology is how to match different peak luminances among contents and capabilities of various target devices, rather than how to generate the HDR-based contents.

In general, HDR-based contents may have large differences in peak luminance when compared to SDR-based contents, such that implementation for simple tone mapping algorithms is needed. Such tone mapping algorithms are algorithms of exclusive techniques depending on manufacturers, but most of them are based on simple linear tone mapping that increases a dynamic range of legacy contents according to capabilities of target devices.

FIG. 1 illustrates an example of a method for displaying contents in a conventional electronic device.

Referring to FIG. 1, an SDR-based content source 101 is linearly mapped according to a capability of a reproduction device 100 based on a peak luminance of the SDR-based content source 101. The reproduction device 100 displays the linearly mapped content.

Meanwhile, there are various conventional content techniques for displaying HDR-based contents. Current effort for the HDR technology involves standardization of the HDR-based contents and HDR-supporting display devices, but there was not much consideration of backwards capabilities and there is no standardized method for displaying SDR-based contents with maximal capabilities of HDR-supporting devices.

One of methods for providing HDR-based contents in conventional HDR-supporting devices is an inverse tone mapping process for converting SDR-based contents into HDR-based contents through unique additional metadata. The inverse tone mapping process is computationally intensive and is difficult to implement in case of absence of unique metadata from contents. In inverse mapping of SDR-based contents to HDR-based contents, the lack of unique metadata may output inconsistent results, which are unique to target device implementation and change not only luminances of the contents, but also colors of the contents, changing the intention of a contents generator.

FIG. 2 illustrates another example of a method for displaying contents in a conventional electronic device.

Referring to FIG. 2, SDR-based content 101 is converted into HDR-based content 103. Through inverse tone mapping between the SDR-based content 101 and the HDR-based content 103, metadata is obtained. Thereafter, the obtained inverse tone metadata is mapped to the SDR-based content 101, such that the mapped data is output to the reproduction device 100. Thus, the reproduction device 100 displays content to which the inverse tone metadata is mapped in the SDR-based content 101. That is, the reproduction device 100 displays the SDR-based content in which the content peak luminance is inversely tone-mapped according to the device capability.

In addition to the methods shown in FIGS. 1 and 2, there may be other conventional methods such as pixel-based color enhancement, or general changes for display setting, instead of changes in contents unique to titles. However, the conventional methods may be computationally intensive or may display contents (i.e., changed contents) that are different from a content source.

Therefore, a need exists for effectively displaying contents according to a capability of a reproduction device.

DETAILED DESCRIPTION OF THE INVENTION

Technical Problem

An embodiment of the present disclosure provides an apparatus and a method for controlling a contrast ratio of content in an electronic device.

An embodiment of the present disclosure also provides an apparatus and method for controlling a contrast ratio of content to effectively display SDR-based content in an HDR-supported device in an electronic device.

Technical Solution

A method for controlling a contrast ratio of content in an electronic device according to an embodiment of the present disclosure includes identifying one or more highlight regions based on luminance information of a frame including the content, deciding thresholds for detecting the one or more highlight regions in the frame, generating one or more masks corresponding to the one or more highlight regions based on the thresholds, and generating a contrast ratio-controlled frame based on the one or more masks and one or more boosting factors for the content.

An electronic device for controlling a contrast ratio of content according to an embodiment of the present disclosure includes a transceiver configured to transmit and receive data and a processor configured to identify one or more highlight regions based on luminance information of a frame including the content, to decide thresholds for detecting the one or more highlight regions in the frame, to generate one or more masks corresponding to the one or more highlight regions based on the thresholds, and to generate a contrast ratio-controlled frame based on the one or more masks and one or more boosting factors for the content.

Other aspects, advantages, and key features of the present disclosure will be processed together with the attached drawings, and will be apparent to those of ordinary skill in the art from the following detailed description disclosing various embodiments of the present disclosure.

Before undertaking the DETAILED DESCRIPTION OF THE INVENTION below, it may be advantageous to set forth definitions of certain words and phrases used throughout this patent document: The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

Throughout the drawings, similar reference numerals will be understood to refer to identical or similar elements, features, and structures.

MODE FOR CARRYING OUT THE INVENTION

Figure 1:
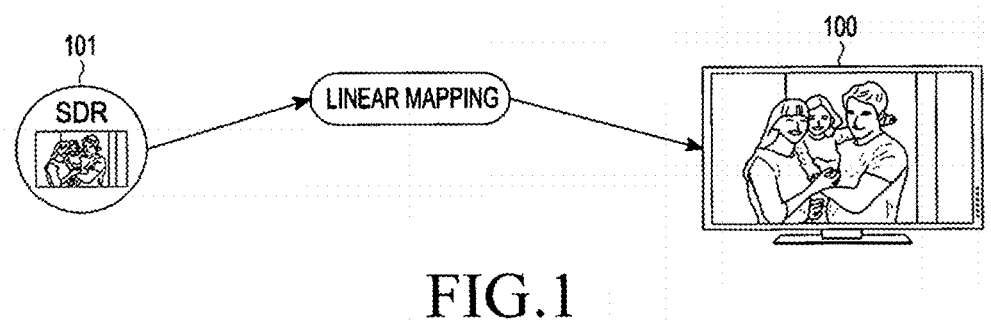
FIG. 1 illustrates an example of a method for displaying contents in a conventional electronic device.
Figure 2:
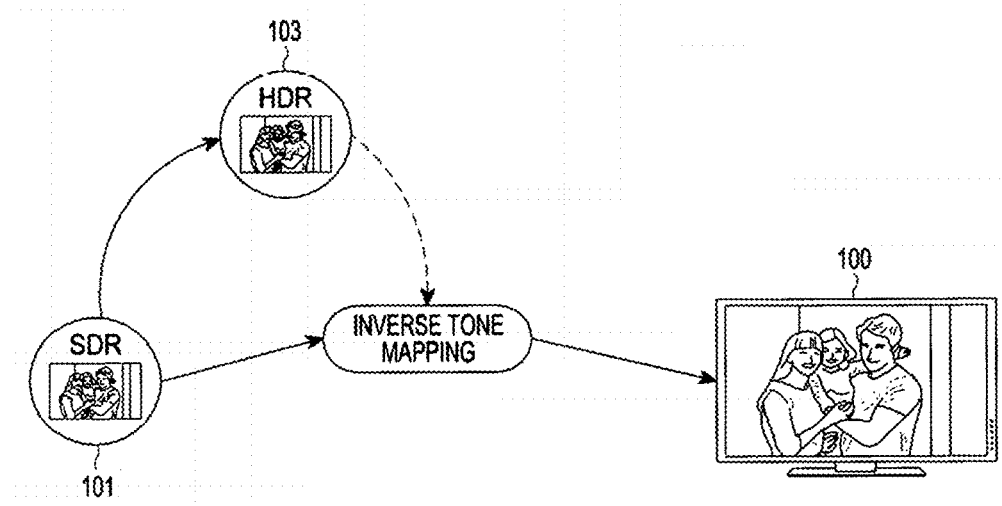
FIG. 2 illustrates another example of a method for displaying contents in a conventional electronic device.

The following detailed description made referring to the accompanying drawings may help the comprehensive understanding of various embodiments of the present disclosure defined by claims and equivalents thereof. The following detailed description includes various specific details for understanding thereof, but these details will be regarded simply as examples. Therefore, those of ordinary skill in the art may recognize that various changes and modifications of various embodiments described herein may be made without departing from the scope and spirit of the present disclosure. In addition, a description of well-known functions and structures may be omitted for clarity and brevity.

Terms and words used in the following detailed description and claims are not limited to bibliographic meaning, but merely used by the inventor to enable a clear and consistent understanding of the present disclosure. Thus, it should be apparent to those of ordinary skill in the art that the following description of various embodiments of the present disclosure is provided merely for illustrative purposes, and not for purposes of limiting the present disclosure defined by the claims and their equivalents.

It is to be understood that the singular forms "a," "an," and "the" include plural referents unless the context clearly dictates otherwise. Thus, for example, a component surface includes one or more component surfaces.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology.

A main subject matter according to an embodiment of the present disclosure is controlling a contrast ratio of content, and more specifically, maintaining an intention and a color of content by identifying and controlling a specific region (e.g., a white (or black) region) in the content. Herein, the content forms frames or scenes, and in an embodiment of the present disclosure, an operation of controlling a contrast ratio of content may be performed on a frame basis or a scene basis.

Thus, a user may experience enhanced "2.5D" content and use a capability for the entire luminance range of a reproduction device. The identification of the white (or black) region in one scene may be selected based on various algorithms and concepts, and the degree of enhancement of the white (or black) region may also be determined by content and a target reproduction device. A detailed description thereof will be made below. Herein, content to which an embodiment of the present disclosure is applied may be content having any dynamic range, and the following description will assume that the content is SDR-based content as an example for convenience.

Figure 3:
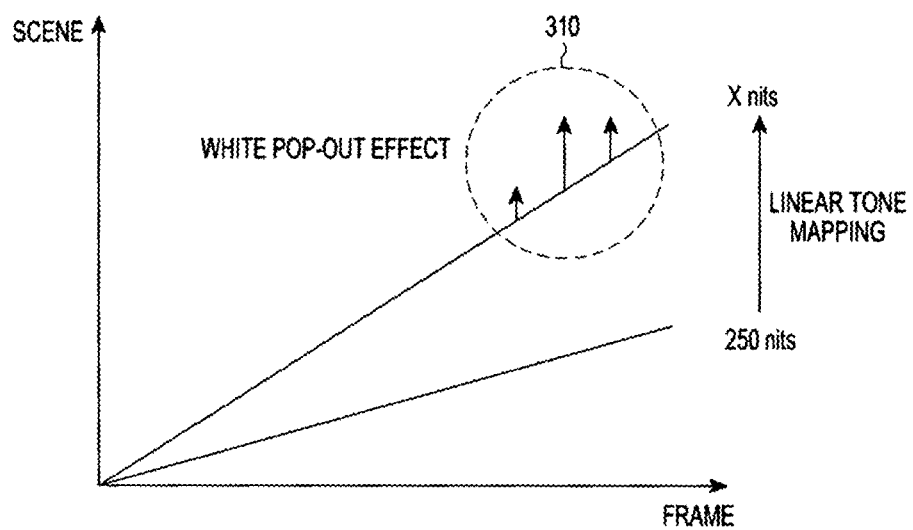
FIG. 3 illustrates an example of a result of a pop-out effect to which an embodiment of the present disclosure is applied.

According to an embodiment of the present disclosure, by generating a brightness pop-out effect by an HDR-supporting device through white reproduction, input SDR-based content may be enhanced as shown in FIG. 3. FIG. 3 illustrates an example of a result of a pop-out effect to which an embodiment of the present disclosure is applied.

By applying a method for controlling a contrast ratio of content according to an embodiment of the present disclosure to a frame having a brightness of 250 nits, results of a white pop-out effect 310 according to an embodiment of the present disclosure may be shown on unique (i.e., for a bright of X nits) linear tone mapping curves.

Figure 4:
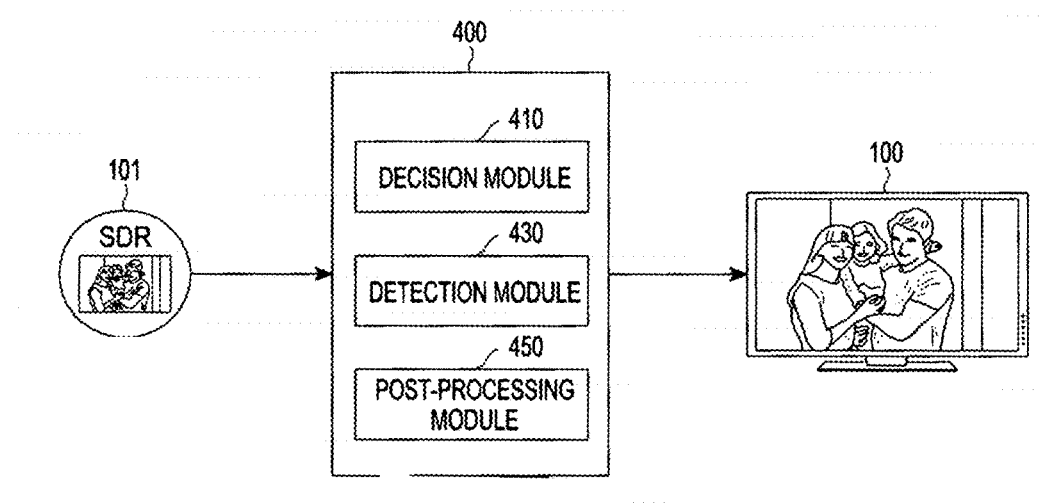
FIG. 4 is a block diagram of main elements of an apparatus for controlling a contrast ratio of content according to an embodiment of the present disclosure.

FIG. 4 is a block diagram of main elements of an apparatus for controlling a contrast ratio of content according to an embodiment of the present disclosure.

An apparatus 400 for controlling a contrast ratio of content according to an embodiment of the present disclosure receives SDR-based content 101, performs post-processing on the received SDR-based content 101, and delivers the post-processed SDR-based content 101 to a display unit of the reproduction device 100. The apparatus 400 for controlling a contrast ratio of content may be included in the reproduction device 100 or may be provided as a device that is separate from the reproduction device 100. For example, the apparatus 400 may be implemented to improve content before content distributors transmit content to final reproduction devices, or may be implemented in a reproduction device (e.g., inside a set-top box or in the reproduction device). Hereinbelow, for convenience of a description, the apparatus 400 will be defined as a pop-out engine.

Referring to FIG. 4, the pop-out engine 400 may include a decision module 410, a detection module 430, and a post-processing module 450.

The decision module 410 decides parameters for detecting one or more highlight regions from content to generate at least one mask for enhancing a contrast ratio of a white (or black) region. Herein, one parameter may be applied to one or more highlight regions, and may include a hard threshold, a soft threshold, and a boosting factor. The hard threshold, the soft threshold, and the boosting factor, and an operation of deciding one parameter will be described in detail below.

The detection module 430 generates one or more masks corresponding to the one or more highlight regions, based on hard thresholds and soft thresholds included in the decided parameters. The post-processing module 450 applies a corresponding boosting factor to each of the generated one or more masks for white reproduction pop-out and contrast ratio improvement, and combines the one or more masks to which the boosting factors are applied into one mask. Herein, the boosting factor corresponds to a mathematical term "factor". For example, the post-processing module 450 may multiply each of the generated one or more masks by a number greater than or less than 1 as the boosting factor.

Meanwhile, the pop-out engine 400 is illustrated as including a plurality of modules in FIG. 4, but the plurality of modules may be integrated and implemented as at least one processor depending on an embodiment. A detailed description of each of the modules included in the pop-out engine 400 will refer to FIGS. 6 through 10.

Figure 5A:
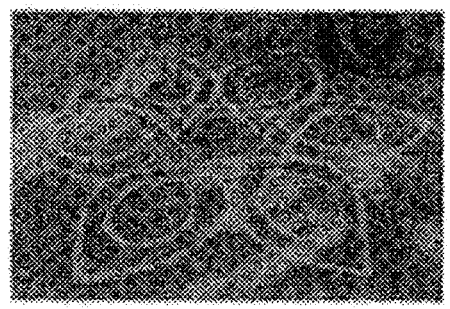
FIGS. 5A, 5B and 5C illustrate various examples of content output from a pop-out engine according to an embodiment of the present disclosure.
Figure 5B:
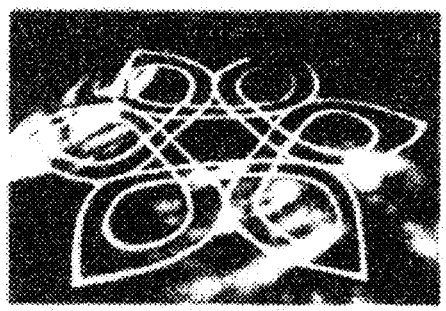
Figure 5C:
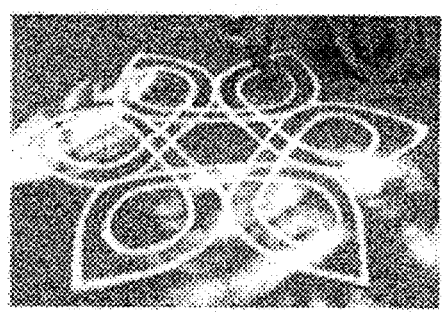

Through the foregoing operation of the pop-out engine 400, the content 101 input to the pop-out engine 400 may output SDR-based content enhanced as shown in FIG. 5.

FIG. 5 illustrates an example of content output from the pop-out engine 400 according to an embodiment of the present disclosure.

Referring to FIG. 5, once an original SDR-based scene (a) is input, the pop-out engine 400 generates a merged mask (b) including two different masks (e.g., a white mask and a black mask) highlighting white regions in the input SDR-based scene (a). The pop-out engine 400 then outputs an improved scene (c) by applying boosting factors to the generated mask (b).

Herein, a description has been made of the embodiment where the boosting factors are applied to the mask generated by merging the two different masks, but in another embodiment, a corresponding boosting factor may be applied to each of the two different masks and then the boosting factor-applied masks may be combined.

Figure 6:
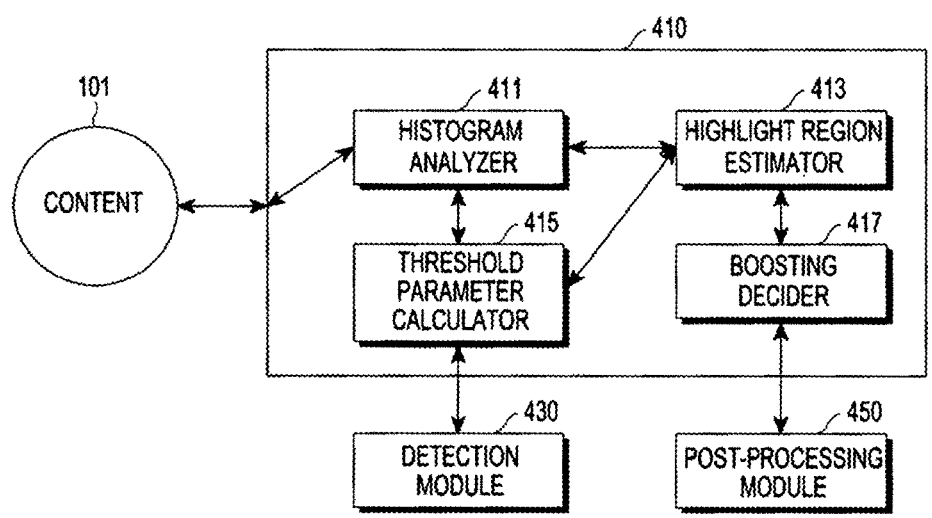
FIG. 6 is a block diagram of an internal structure of a decision module included in a pop-out engine according to an embodiment of the present disclosure.

FIG. 6 is a block diagram of an internal structure of the decision module 410 included in the pop-out engine 400 according to an embodiment of the present disclosure.

Referring to FIG. 6, the decision module 410 included in the pop-out engine 400 decides parameters for hard thresholds, soft thresholds, and boosting factors for generating at least one mask. Herein, the parameters may vary with available various algorithms. In particular, the decision module 410 analyzes a luminance histogram about the frame 101 and decides and uses an algorithm for selecting the parameters. Herein, the decision module 410 analyzes the luminance histogram about the frame, but the decision module 410 may also analyze a luminance histogram about a scene. Thus, while a description has been made of a method for controlling a contrast ratio on a frame basis for convenience, an embodiment of the present disclosure is also applicable to a method for controlling a contrast ratio on a scene basis.

More specifically, the decision module 410 may include a histogram analyzer 411, a highlight region estimator 413, a threshold parameter calculator 415, and a boosting decider 417. The histogram analyzer 411 analyzes the input content 101. Herein, the input content 101 may include frames and scenes. The histogram analyzer 411 generates luminance histogram information by analyzing a frame included in the content 101. The histogram analyzer 411 delivers the luminance histogram information generated for the frame to the highlight region estimator 413 and the threshold parameter calculator 415.

Once receiving the luminance histogram information from the histogram analyzer 411, the highlight region estimator 413 estimates one or more highlight regions that may exist in the content 101 based on the luminance histogram information. The highlight region estimator 413 selects a corresponding algorithm for identifying the estimated highlight regions. Herein, even if different algorithms are selected by the highlight region estimator 413, the one or more highlight regions in the frame may be identified. The highlight regions are specific regions included in a region of interest for white enhancement or white enhancement prevention in the frame. For example, the highlight regions may include at least one of white regions, black regions high-luminance regions, low-luminance regions, saturated highlights, skin-tone regions, sky-tone regions, and specified area regions based on manual input or possible metadata, which are identified based on the luminance histogram information.

The highlight region estimator 413 estimates highlight regions based on a nature of a region by using various algorithms. Herein, the various algorithms may include at least one of an algorithm for selecting a pixel from the entire frame based on pixel luminance characteristics (e.g., three primary color values (RGB), color space values (YCrCb), a brightness value (Luma)), a skin detection algorithm, and a sky detection algorithm.

The skin detection algorithm detects and changes a skin color of a person included in a frame. Generally, change of skin tones is not desired in content enhancement. An embodiment of the present disclosure may identify skin tones as highlight regions to enhance skin tones captured as bright or dark regions (naturally or due to an illumination) without directly changing a saturation degree or a color of the content 101. In an embodiment of the present disclosure, if change of a skin tone is not desired, highlight regions such as skin may be identified using the skin detection algorithm to avoid changing the skin color of a person in a frame.

The sky detection algorithm may regard sky regions as special highlight regions in the frame. In an embodiment of the present disclosure, if change of a sky tone is not desired, highlight regions such as sky may be identified using the sky detection algorithm to avoid changing the sky color in a frame.

In FIG. 6, the threshold parameter calculator 415 decides a hard threshold and a soft threshold based on a luminance histogram generated by the histogram analyzer 411 and an algorithm selected by the highlight region estimator 413. If a plurality of algorithms are selected by the highlight region estimator 413, the threshold parameter calculator 415 decides a hard threshold and a soft threshold corresponding to each algorithm. The thresholds may be directly input manually or through metadata.

The decision module 410 decides parameters for the hard threshold and the soft threshold as described below.

The hard threshold is a value for identifying a boundary of a specific highlight region in the content 101. The hard threshold is decided based on at least one of an average pixel luminance and a luminance highlight distribution of the content 101 in the luminance histogram information. The average pixel luminance may be determined using Equation 1.

$$A = \frac{1}{N}\sum_{i=0}^{L_{max}} L_i * P_i \quad \text{Equation 1}$$

Figure 7:
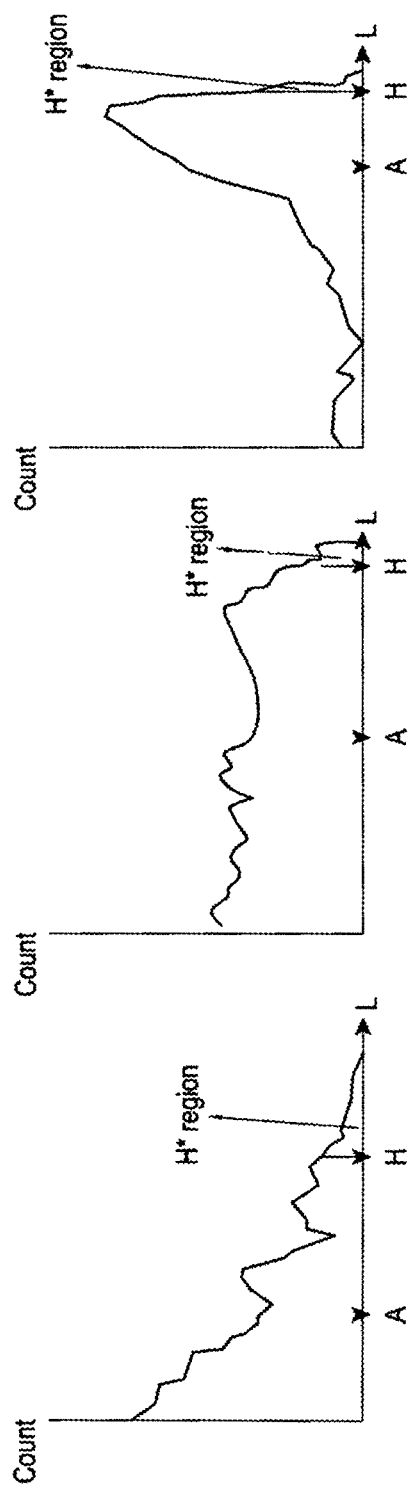
FIGS. 7 and 8 illustrate examples of a method for determining a hard threshold value and a soft threshold value by a decision module according to an embodiment of the present disclosure.

Herein, A indicates an average pixel luminance, N indicates a total pixel count (or the number of total pixels) in one frame (screen), L indicates a luminance value (e.g., a value corresponding to a horizontal axis in a histogram of FIG. 7), and P indicates a pixel count.

For example, for one frame including a total of 100 pixels which have 20 pixels with L=100 nits, 50 pixels with L=400 nits, and 30 pixels with L=1000 nits, an average luminance A is equal to (1/100)*(100*20+400*50+1000*30)=520 nits.

The average pixel luminance has a smaller value than the hard threshold and a maximum luminance. That is, the average pixel luminance, the hard threshold, and the maximum luminance have a relationship expressed by Equation 2.

$$\text{Average Pixel Luminance} < \text{Hard Threshold} < \text{Maximum Luminance} \quad \text{Equation 2}$$

Figure 8:
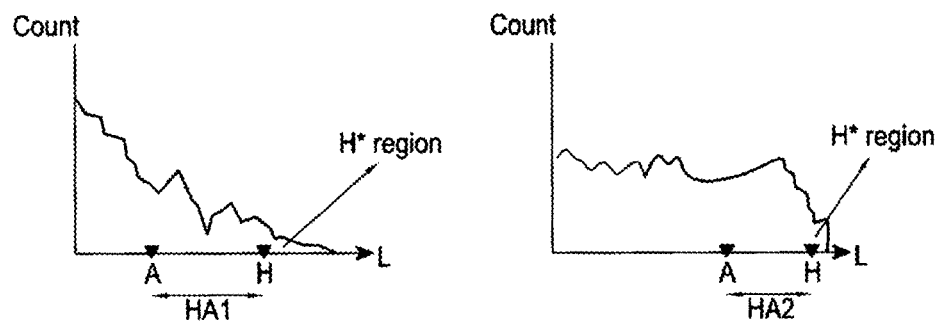

For example, FIGS. 7 and 8 show a hard threshold H and a soft threshold A in luminance histogram information. As shown in FIGS. 7 and 8, the hard threshold H of each frame is decided based on a hard boosting (H*) region that may be determined as a number indicating a specific percentage with respect to a total pixel count N of one frame. For example, if H is 20% in a frame having a total pixel count of 100, this means that a pixel count corresponding to the hard-boosting region is 100*20%=20.

That is, the H* region may be determined using Equation 3.

$$H^*\text{Region} = \% \text{ of Total Pixel Count of One Frame} \quad \text{Equation 3}$$

Next, the soft threshold may be a function of the hard threshold. The soft threshold A is determined as a value in a specific range from the determined hard threshold based on light distribution of a frame/scene.

Herein, for the light distribution of the frame/scene, rough light distribution (i.e., histogram information) may be predicted based on a value of P (a distributed pixel count, see Equation 1) for L=0, A, S, H, and max, in case of absence of the entire histogram information (as shown in FIG. 7) for all luminances. The boosting decider 417 decides a boosting factor corresponding to each highlight region based on an algorithm used for identifying each highlight region in the highlight region estimator 413 and information of the input content 101 (i.e., information about frame/scene/entire content). The boosting factor may be directly input manually or through metadata.

Figure 9:
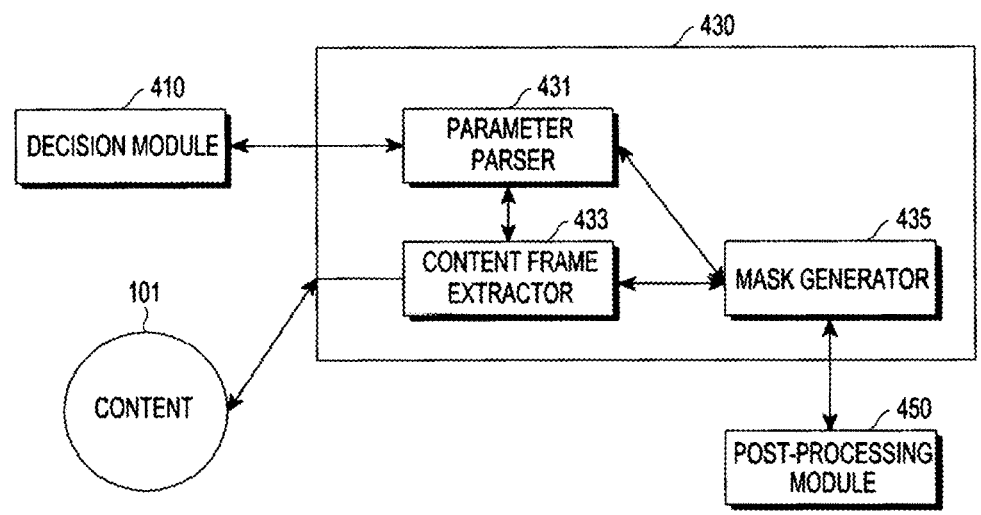
FIG. 9 is a block diagram of an internal structure of a detection module included in a pop-out engine according to an embodiment of the present disclosure.

FIG. 9 is a block diagram of an internal structure of the detection module 430 included in the pop-out engine 400 according to an embodiment of the present disclosure.

Referring to FIG. 9, the detection module 430 generates a mask for each of the parameters determined by the decision module 410 and identifies one or more highlight regions in a frame. Herein, each of the one or more masks includes code values of 1 or 0 for identifying specific pixels (i.e., white (or black) pixels) in a frame. To apply different boosting factors to different masks (herein, different regions in the content 101), various masks may be used. An algorithm for generating the masks is decided by an algorithm used to select proper parameters in the decision module 410, and the decided algorithm may be supplemented.

More specifically, the detection module 430 may include a parameter parser 431, a content frame extractor 433, and a mask generator 435. The parameter parser 431 parses the parameters delivered from the decision module 410 to check at least one of pixel luminance thresholds, pixel color luminance thresholds (in various color spaces), and pixel positions in a frame.

The content frame extractor 433 extracts a matching frame from content corresponding to the parameters parsed by the parameter parser 431.

The mask generator 435 applies parameters for the hard threshold and the soft threshold to the extracted frame by using the same algorithm as the algorithm selected by the highlight region estimator 413 included in the decision module 410. Herein, each of the parameters for the hard threshold and the soft threshold is used to generate a mask for a specific highlight region. That is, the mask generator 435 generates one or more masks depending on the number of highlight regions parsed in the highlight region estimator 413.

Figure 10:
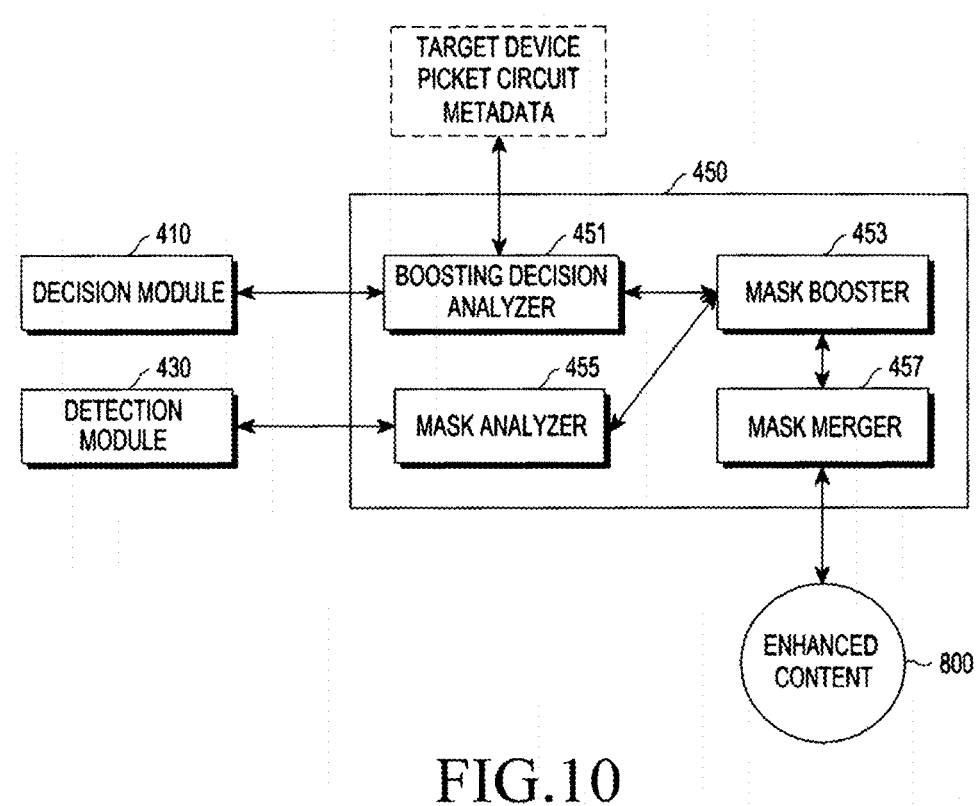
FIG. 10 is a block diagram of an internal structure of a post-processing module included in a pop-out engine according to an embodiment of the present disclosure.

FIG. 10 is a block diagram of an internal structure of the post-processing module 450 included in the pop-out engine 400 according to an embodiment of the present disclosure.

Referring to FIG. 10, the post-processing module 450 applies the parameter for each of the boosting factors decided by the decision module 410 to the mask generated by the detection module 430. Herein, various boosting factors may be used to improve various masks relying on the use of a reproduction device and a frame.

More specifically, the post-processing module 450 may include a boosting decision analyzer 451, a mask booster 453, a mask analyzer 455, and a mask merger 457. The boosting decision analyzer 451 analyzes the parameters for the boosting factors delivered from the boosting decider 417. The boosting decision analyzer 451 compares the parsed parameters with available additional information (in the form of peak luminance metadata or in other data form capable of relaying device capability information) of a target device or any other compatible device of a user. Based on the additional information from the target device or the other device, the boosting decision analyzer 451 adjusts the parameters for the boosting factors to adjust improvement of capabilities of the target device or the other device.

The mask analyzer 455 analyzes each of the masks generated by the mask generator 435, matches each of the analyzed masks with a parameter for a corresponding boosting factor of the boosting decision analyzer 451, and delivers the mask to the mask booster 453.

The mask booster 453 applies the parameter for the boosting factor delivered from the mask decision analyzer 451 to the mask delivered from the mask analyzer 455. A boosting level applied to each mask varies with parameters for the boosting factor (for example, there is no boosting on the skin highlight regions).

The mask merger 457 merges all boosted masks delivered from the mask booster 453 and outputs the merged masks as a frame included in final enhanced content 800.

Figure 11:
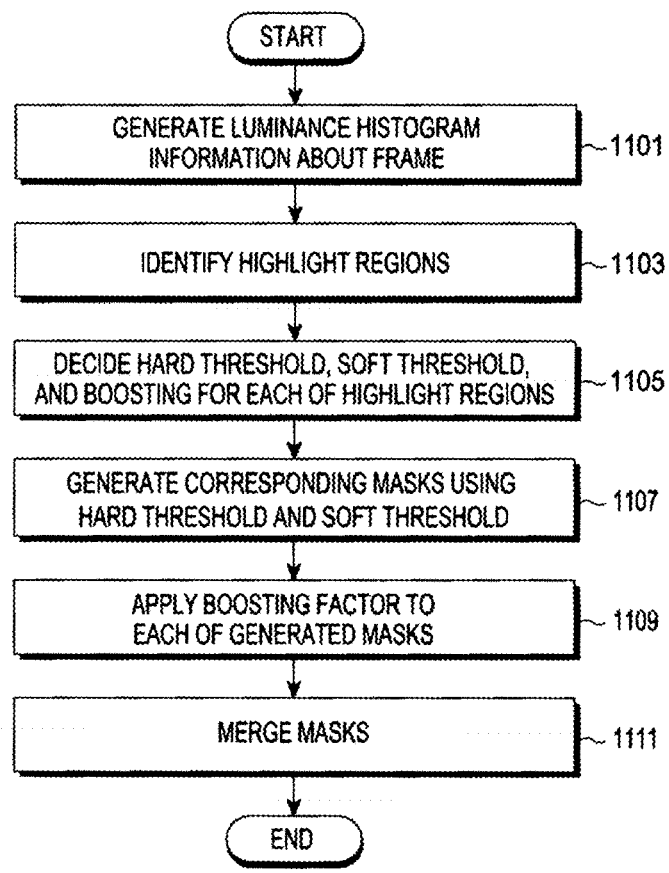
FIG. 11 is a flowchart of a method for controlling a contrast ratio of contents according to an embodiment of the present disclosure.

The structure of the pop-out engine 400 has been described in detail with reference to FIGS. 4 through 10, and the following description will be made of a method for controlling a contrast ratio of content by the pop-out engine 400 with reference to FIG. 11. FIG. 11 is a flowchart of a method for controlling a contrast ratio of contents according to an embodiment of the present disclosure.

Referring to FIG. 11, the pop-out engine 400 generates luminance histogram information of a frame included in input content. The pop-out engine 400 identifies one or more highlight regions from the luminance histogram information in operation 1103. The pop-out engine 400 identifies one or more highlight regions from luminance histogram information regarding the content by using predetermined one or more algorithms.

The pop-out engine 400 determines a parameter for each of the one or more highlight regions in operation 1105. Herein, the parameter includes a hard threshold, a soft threshold, and a boosting factor.

The pop-out engine 400 generates one or more masks corresponding to the one or more highlight regions by using a hard threshold and a soft threshold for each of the one or more highlight regions in the frame in operation 1107.

The pop-out engine 400 applies a boosting factor to each of the generated one or more masks in operation 1109. The pop-out engine 400 outputs a final enhanced frame by merging the boosting-factor applied masks into one mask in operation 1111. Meanwhile, in other ways different from operations 1109 and 1111, the pop-out engine 400 may merge the generated one or more masks into one mask and output a final enhanced frame by applying one or more boosting factors for the one or more highlight regions to the merged mask.

Figure 12A:
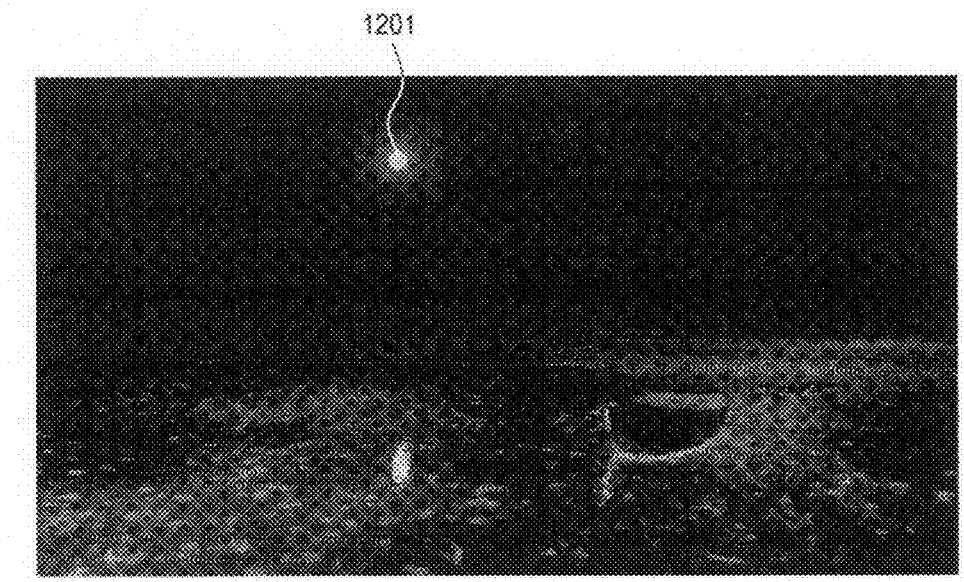
FIGS. 12A, 12B, 13A and 13B illustrate various results indicating that a contrast ratio of content is enhanced by an operation of a pop-out engine according to an embodiment of the present disclosure.
Figure 12B:
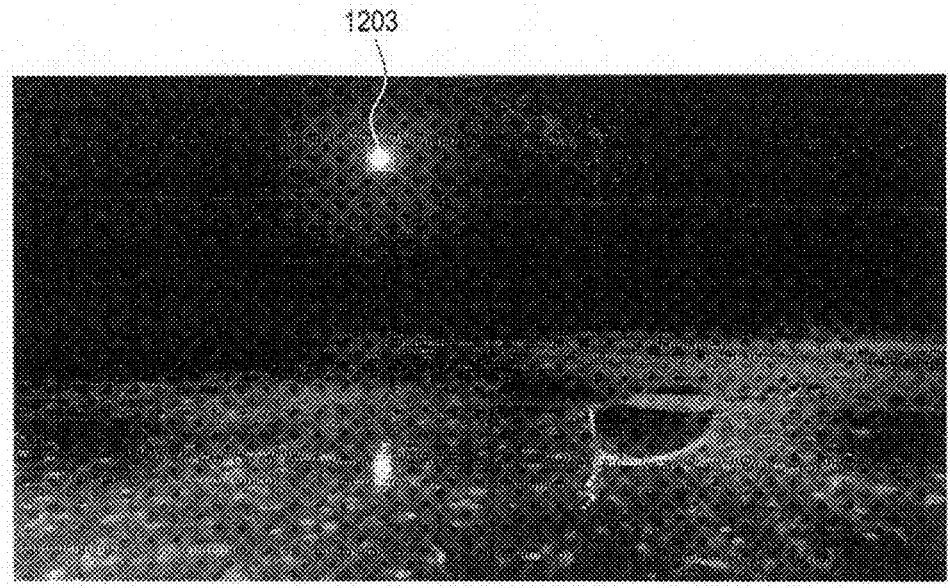
Figure 13A:
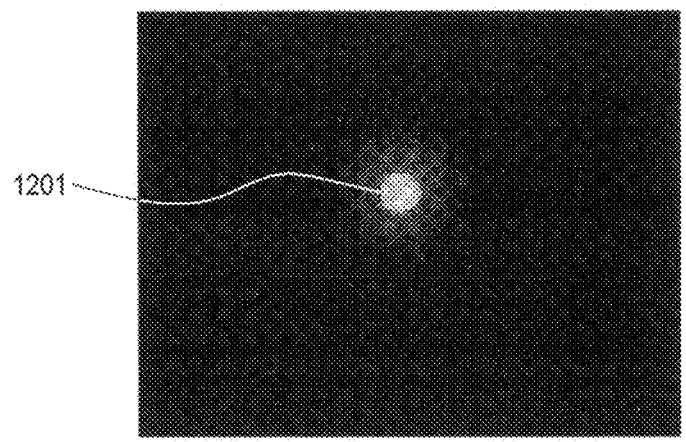
Figure 13B:
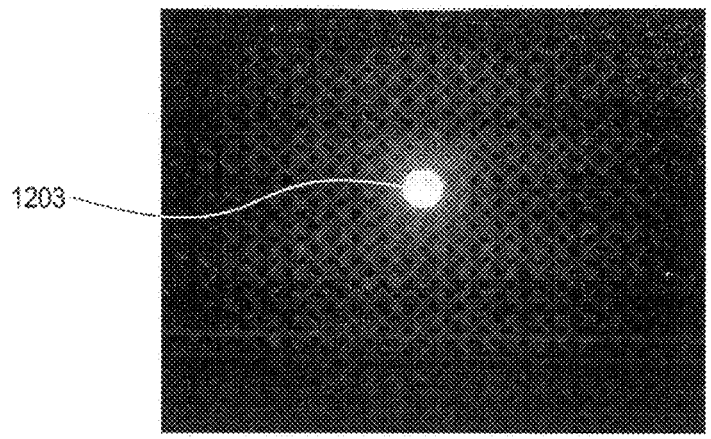

FIG. 12 illustrates a result indicating that a contrast ratio of content is enhanced by an operation of the pop-out engine 400 according to an embodiment of the present disclosure.

Referring to FIG. 12, (a) illustrates a frame input to the pop-out engine 400 and (b) illustrates an example of a frame output from the pop-out engine 400.

If the frame (a) is input to the pop-out engine 400 according to an embodiment of the present disclosure, the pop-out engine 400 outputs the frame (b) having an improved brightness compared to the input frame (a) as indicated by 1201 and 1203. That is, as can be seen in the frame (b) of FIG. 12, a moon part, which is originally bright, becomes brighter and a part, which is not very dark around the moon part, is also boosted and becomes brighter. Therefore, according to an embodiment of the present disclosure, by controlling a contrast ratio of content, a visual pop-out effect (a cubic effect between two dimensions (2D) and 3D) may be shown.

While embodiments of the present disclosure have been described, various changes may be made without departing the scope of the present disclosure. Therefore, the scope of the present disclosure should be defined by the appended claims and equivalents thereof, rather than by the described embodiments.

What is claimed is:

1. A method for controlling a contrast ratio of content in an electronic device, the method comprising:
  receiving the content, the content being standard dynamic range (SDR) content including one or more frames;
  identifying one or more highlight regions based on luminance information of each of the one or more frames included in the SDR content;
  deciding thresholds based on the one or more highlight regions in the each of the one or more frames;
  generating one or more masks corresponding to the one or more highlight regions based on the thresholds for the each of the one or more frames;
  generating a contrast ratio-controlled frame based on the one or more masks and one or more boosting factors for the each of the one or more frames; and
  generating high dynamic range (HDR) content based on the contrast ratio-controlled frame generated for the each of the one or more frames, wherein the thresholds comprise a hard threshold for identifying a boundary of a highlight region and a soft threshold for each of the one or more highlight regions, and wherein the hard threshold is decided based on an average pixel luminance and a luminance highlight distribution in the luminance information, is greater than the average pixel luminance and smaller than a maximum luminance, and is determined as a number indicating a specific percentage with respect to a total pixel count of one frame.

2. The method of claim 1, wherein the luminance information is decided based on a luminance histogram.

3. The method of claim 2, wherein the one or more highlight regions are identified by a predetermined algorithm, and correspond to one or more of a white region, a black region, a high-luminance region, a low-luminance region, a saturated highlight, a skin tone region, a sky tone region, and a specified area region in the luminance histogram.

4. The method of claim 1,
wherein the soft threshold is decided in a predetermined range from the hard threshold according to light distribution of the each of the one or more frames.

5. The method of claim 1, wherein each of the one or more boosting factors has a different value for each of the one or more masks.

6. The method of claim 1, wherein the generating of the contrast ratio-controlled frame comprises:
applying a boosting factor of the one or more boosting factors to each of the one or more masks, and
merging the one or more masks to which the boosting factors are applied into the one mask.

7. The method of claim 1, wherein the generating of the contrast ratio-controlled frame comprises:
merging the one or more masks into the one mask, and
applying the one or more boosting factors to the merged one mask.

8. An electronic device for controlling a contrast ratio of content, the electronic device comprising:
a transceiver configured to transmit and receive data; and
a processor configured to:
receive the content, the content being standard dynamic range (SDR) content including one or more frames,
identify one or more highlight regions based on luminance information of each of the one or more frames included in the SDR content,
decide thresholds based on the one or more highlight regions in the each of the one or more frames,
generate one or more masks corresponding to the one or more highlight regions based on the thresholds for each of the one or more frames,
generate a contrast ratio-controlled frame based on the one or more masks and one or more boosting factors for the each of the one or more frames, and
generate high dynamic range (HDR) content based on the contrast ratio-controlled frame generated for the each of the one or more frames,
wherein the thresholds comprise a hard threshold for identifying a boundary of a highlight region and a soft threshold for each of the one or more highlight regions, and
wherein the hard threshold is decided based on an average pixel luminance and a luminance highlight distribution in the luminance information, is greater than the average pixel luminance and smaller than a maximum luminance, and is determined as a number indicating a specific percentage with respect to a total pixel count of one frame.

9. The electronic device of claim 8,
wherein the luminance information is decided based on a luminance histogram, and
wherein the one or more highlight regions are identified by a predetermined algorithm, and correspond to one or more of a white region, a black region, a high-luminance region, a low-luminance region, a saturated highlight, a skin tone region, a sky tone region, and a specified area region in the luminance histogram.

10. The electronic device of claim 8,
the soft threshold is decided in a predetermined range from the hard threshold according to light distribution of the each of the one or more frames.

11. The electronic device of claim 8, wherein each of the one or more boosting factors has a different value for each of the one or more masks.

12. The electronic device of claim 8, wherein the processor is further configured to:
apply a boosting factor of the one or more boosting factors to each of the one or more masks, and
merge the one or more masks to which the boosting factors are applied into the one mask.

13. The electronic device of claim 8, wherein the processor is further configured to:
merge the one or more masks into the one mask, and
apply the one or more boosting factors to the merged one mask.

* * * * *